United States Patent
Kim et al.

(10) Patent No.: US 12,399,962 B2
(45) Date of Patent: Aug. 26, 2025

(54) WATERMARKING METHOD FOR SMART CONTRACT

(71) Applicant: Research & Business Foundation SUNGKYUNKWAN UNIVERSITY, Suwon-si (KR)

(72) Inventors: Hyoungshick Kim, Suwon-si (KR); Taeyoung Kim, Suwon-si (KR); Yunhee Jang, Suwon-si (KR); Chanjong Lee, Seoul (KR); Hyungjoon Koo, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 167 days.

(21) Appl. No.: 18/368,734

(22) Filed: Sep. 15, 2023

(65) Prior Publication Data

US 2024/0095316 A1     Mar. 21, 2024

(30) Foreign Application Priority Data

Sep. 15, 2022    (KR) .......................... 10-2022-0116335

(51) Int. Cl.
*G06F 21/16*     (2013.01)
*G06F 8/41*     (2018.01)
(Continued)

(52) U.S. Cl.
CPC .............. *G06F 21/16* (2013.01); *G06F 8/433* (2013.01); *G06F 21/125* (2013.01); *G06Q 30/0283* (2013.01)

(58) Field of Classification Search
CPC ........ G06F 21/16; G06F 21/125; G06F 21/64; G06F 21/1063; G06F 8/433; G06F 8/30;
(Continued)

(56) References Cited

FOREIGN PATENT DOCUMENTS

| JP | 2011-155323 A | 8/2011 |
| JP | 2022-002130 A | 1/2022 |

(Continued)

OTHER PUBLICATIONS

Jung, Daeun, "teEther: A Smart Contract Exploit Code Generator", Aug. 22, 2020 (12 Pages in Korean, 2 Pages in English).
(Continued)

*Primary Examiner* — Brian F Shaw
(74) *Attorney, Agent, or Firm* — NSIP Law

(57) ABSTRACT

A watermarking method for smart contract according to an embodiment of the present disclosure comprises compiling a source code of a smart contract to create a contract creation bytecode and a runtime bytecode; generating a control flow graph including a plurality of byte regions based on the runtime bytecode; setting opcode groups by grouping consecutive opcodes in an opcode list in the plurality of byte regions of the generated control flow graph so that a sum of gas costs for the consecutive opcodes is greater than or equal to a preset gas cost value; extracting a watermarkable byte region based on the set opcode groups; determining watermarking bytes, in which a watermark is to be embed in the watermarkable byte region, to embed the watermark and storing location information of the determined watermarking bytes; hashing fingerprint information including information on the watermark and the location information of the watermarking bytes to create a fingerprint; and embedding the created fingerprint in the contract creation bytecode to deploy the smart contract. Hence, the watermark can be embedded without an additional executable code and a gas fee in a smart contract program.

13 Claims, 5 Drawing Sheets

(51) Int. Cl.
*G06F 21/12* (2013.01)
*G06Q 30/0283* (2023.01)

(58) Field of Classification Search
CPC ............ G06F 9/45508; G06Q 30/0283; G06Q 20/382
See application file for complete search history.

(56) References Cited

FOREIGN PATENT DOCUMENTS

| | | |
|---|---|---|
| KR | 10-2013-0101651 A | 9/2013 |
| KR | 10-2163930 B1 | 10/2020 |
| KR | 10-2263692 B1 | 6/2021 |
| KR | 10-2398543 B1 | 5/2022 |
| KR | 10-2022-0077598 A | 6/2022 |

OTHER PUBLICATIONS

Korean Office Action Issued on Aug. 27, 2024, in Counterpart Korean Patent Application No. 10-2022-0116335 (6 Pages in English, 6 Pages in Korean).

WATERMARKING METHOD FOR SMART CONTRACT

CROSS-REFERENCE TO RELATED APPLICATIONS

This application claims the priority benefit of Korean Patent Application No. 10-2022-0116335 filed on Sep. 15, 2022, which is incorporated herein by reference for all purposes as if fully set forth herein.

TECHNICAL FIELD

The present disclosure relates to a watermarking method for smart contract. More specifically, the present disclosure relates to a watermarking method for smart contract that determines a watermarking byte to embed a watermark by grouping consecutive opcodes of a runtime bytecode based on a gas cost and creates a fingerprint including information on the watermark and location information on the watermarking byte.

BACKGROUND

A smart contract aims to satisfy common contractual conditions such as payment terms, confidentiality and enforcement, minimize malicious or accidental exceptions, and minimize the need for trusted intermediaries. The smart contract has the advantage that the contents of a contract are clear compared to written contracts and the contract can be immediately fulfilled according to conditions by creating a smart contract through computer code and automatically fulfilling the contract according to the conditions. However, digital data is vulnerable to forgery and alteration, and there is a limit to technology that can ensure the integrity of each data.

With the advent of blockchain following the development of Bitcoin, smart contracts have began to be re-examined. The blockchain is a technology that ensures reliability and integrity of data by allowing all nodes participating in a P2P network to share the same data through a hash connection and a consensus algorithm. Hence, blockchain platforms that support smart contracts such as Ethereum have been developed.

In the case of a smart contract program distributed on a public blockchain platform, since it is open on a blockchain network, it is highly likely to be copied and redistributed by a third party without permission, and copyright infringement is a problem. Since a conventional software watermarking scheme is a method of adding a code for watermarking within a program or utilizing a dynamic memory space, it is not suitable for the smart contract with limitations on size or dynamic allocation. Further, when the smart contract is executed, a fee called a gas is generated, so it is uneconomical to generate additional logic for watermarking. A license identifier can be specified within a smart contract source code written in solidity language, but the copyright holder is not identified through this.

SUMMARY

In order to solve problems of the related art described above, the present disclosure provides a watermarking method for smart contract that determines a watermarking byte to embed a watermark by grouping consecutive opcodes of a runtime bytecode based on a gas cost and creates a fingerprint based on this, so that a watermark can be embedded without an additional executable code and a gas fee.

According to a first aspect of the present disclosure, there is provided a watermarking method for smart contract comprising compiling a source code of a smart contract to create a contract creation bytecode and a runtime bytecode; generating a control flow graph including a plurality of byte regions based on the runtime bytecode; setting opcode groups by grouping consecutive opcodes in an opcode list in the plurality of byte regions of the generated control flow graph so that a sum of gas costs for the consecutive opcodes is greater than or equal to a preset gas cost value; extracting a watermarkable byte region based on the set opcode groups; determining watermarking bytes, in which a watermark is to be embed in the watermarkable byte region, to embed the watermark and storing location information of the determined watermarking bytes; hashing fingerprint information including information on the watermark and the location information of the watermarking bytes to create a fingerprint; and embedding the created fingerprint in the contract creation bytecode to deploy the smart contract.

According to a second aspect of the present disclosure, there is provided a smart contract watermarking device comprising a communication unit configured to transmit and receive data with a user; a memory configured to store a source code of a smart contract; at least one processor connected to the memory; and an input/output unit, wherein the at least one processor is configured to compile the source code of the smart contract and create a contract creation bytecode and a runtime bytecode; generate a control flow graph including a plurality of byte regions based on the runtime bytecode; set opcode groups by grouping consecutive opcodes in an opcode list in the plurality of byte regions of the generated control flow graph so that a sum of gas costs for the consecutive opcodes is greater than or equal to a preset gas cost value; extract a watermarkable byte region based on the set opcode groups; determine watermarking bytes, in which a watermark is to be embed in the watermarkable byte region, to embed the watermark and store location information of the determined watermarking bytes; hash fingerprint information including information on the watermark and the location information of the watermarking bytes to create a fingerprint; and embed the created fingerprint in the contract creation bytecode and deploy the smart contract.

According to a third aspect of the present disclosure, there is provided a computer readable recording medium in which a program of instructions capable of being executed by a digital processing device for smart contract watermarking is tangibly implemented, the computer readable recording medium being a recording medium readable by the digital processing device, wherein a program for executing the method according to any one of claims 1 to 6 on a computer is recorded on the computer readable recording medium.

A watermarking method for smart contract according to an embodiment of the present disclosure provides the following effects.

Even when the watermarking method determines watermarking bytes to embed a watermark and creates a fingerprint based on this by forming a control flow graph in a runtime byte, extracting a plurality of byte regions, setting opcode groups in an opcode list of the corresponding byte region based on a gas cost, selecting some of the opcode groups, and extracting a watermarkable byte region from the selected opcode group, an executable code is not added to an original smart contract byte, there is no change in a control flow of a program, and a gas fee does not increase.

The watermark is restored on the smart contract program through the fingerprint deployed on a public blockchain, and it is possible to identify the original author for the open smart contract and to detect unauthorized copying so that the rights of the original author can be protected.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

DETAILED DESCRIPTION

Reference will now be made in detail to embodiments of the disclosure, examples of which are illustrated in the accompanying drawings. However, the following description is not intended to limit the present disclosure to a specific implementation. Detailed descriptions of known arts will be omitted if such may mislead the gist of the present disclosure.

Figure 1:
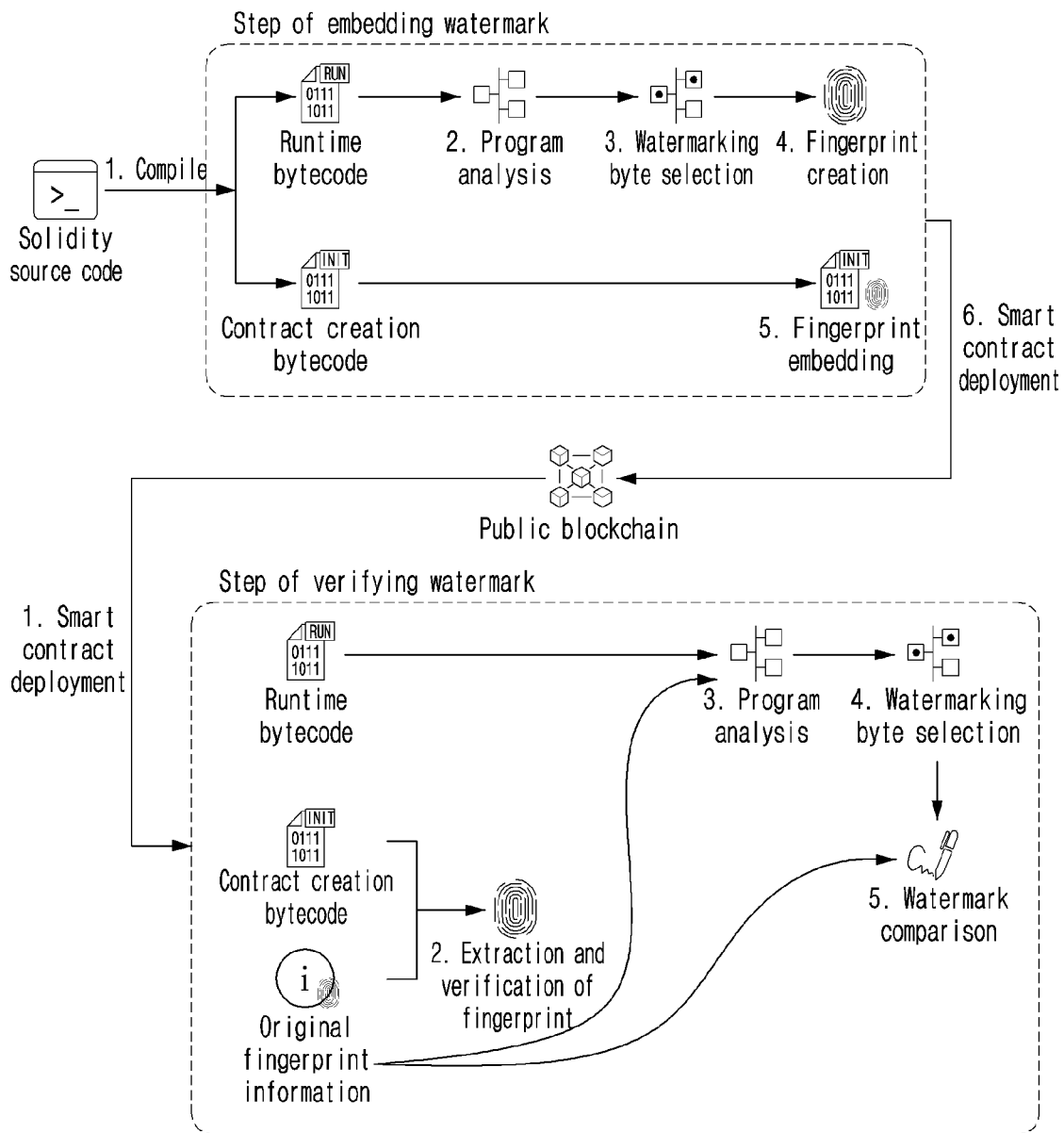
FIG. 1 is a conceptual diagram sequentially illustrating a series of procedures of a watermarking method for smart contract according to an embodiment of the present disclosure.
Figure 2:
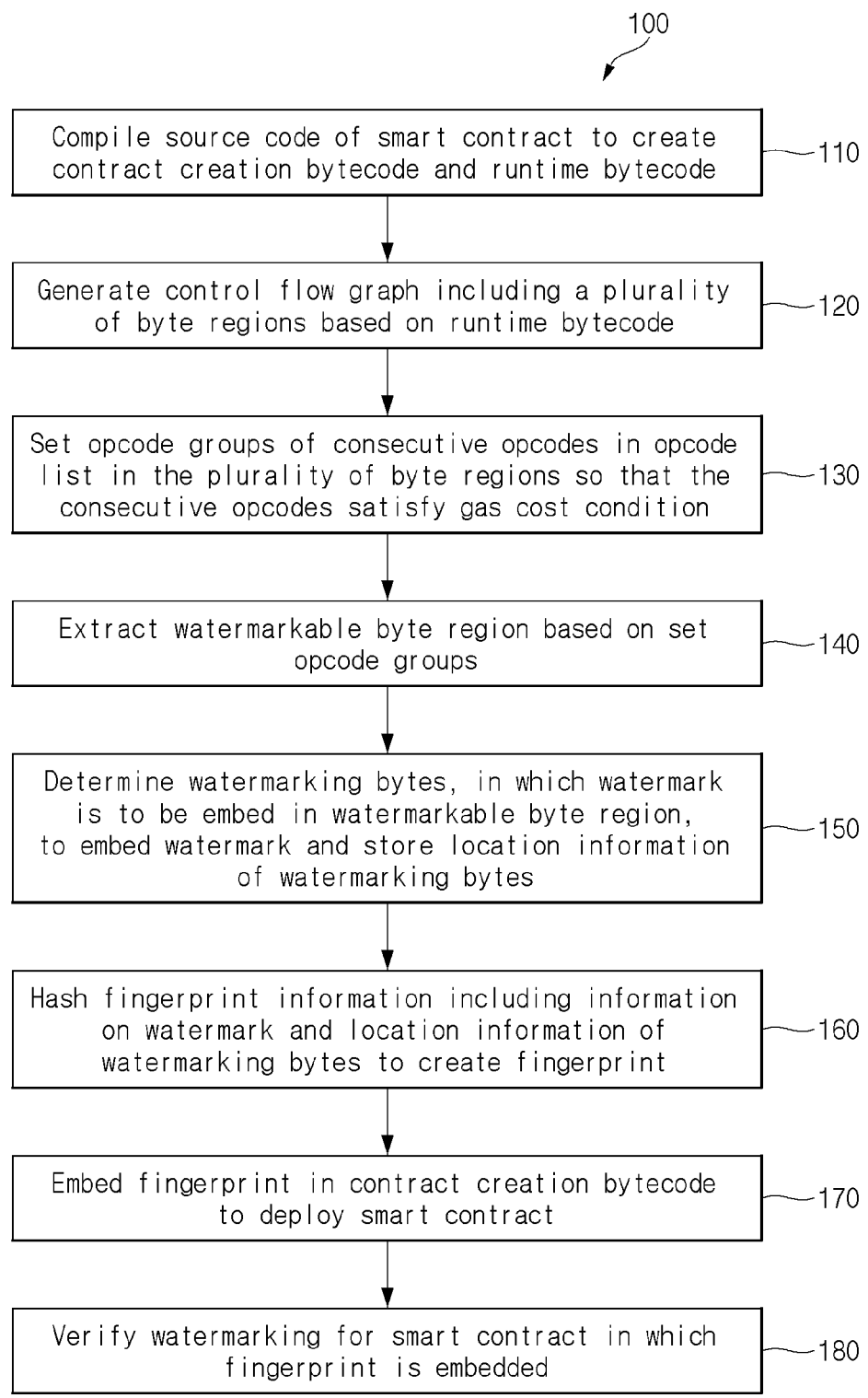
FIG. 2 is a flowchart illustrating a watermarking method for smart contract according to an embodiment of the present disclosure.
Figure 3:
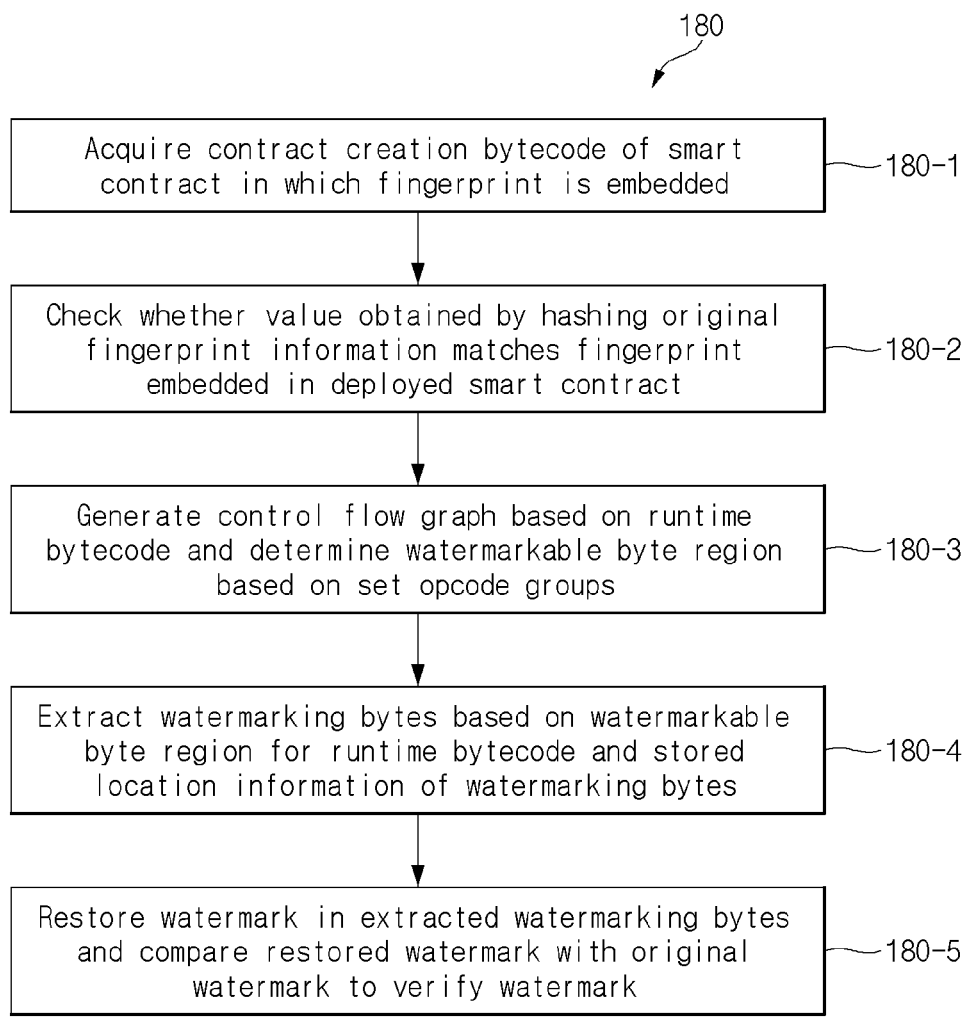
FIG. 3 is a flowchart illustrating a method of verifying a watermark embedded in a deployed smart contract according to an embodiment of the present disclosure.

FIG. 1 is a conceptual diagram sequentially illustrating a series of procedures of a watermarking method for smart contract according to an embodiment of the present disclosure. FIG. 2 is a flowchart illustrating a watermarking method for smart contract. FIG. 3 is a flowchart illustrating a method of verifying a watermark embedded in a deployed smart contract.

A watermarking method for smart contract according to an embodiment of the present disclosure may comprise a step of embedding a watermark in a bytecode of a smart contract, and a step of verifying the watermark from a contract deployed on a public blockchain network. In the present disclosure, it should be noted that the 'smart contract' has been partially used as a term to mean a digital contract function, but most of the smart contract have been used to mean a program hosted and executed on a blockchain network.

A contract creation bytecode is related to creation, initialization and deployment of the smart contract, and a runtime bytecode is related to the execution of smart contract stored on a blockchain network. The two types of bytecodes may be obtained by compiling a smart contract source code. In an embodiment of the present disclosure, the smart contract source code may be written in solidity language.

First, the step of embedding the watermark compiles the smart contract source code to acquire a contract creation bytecode and a runtime bytecode, and uses the runtime bytecode to select a watermarking byte, in which the watermark is to be embedded, through code analysis. This step structuralizes information on the watermark to be embedded and location information of the selected watermark byte and creates a fingerprint through a hashing process to secure the information. This step deploys the smart contract on the public blockchain network by embedding the created fingerprint in the contract creation bytecode.

The step of verifying the watermark verifies the watermark by acquiring the deployed smart contract creation bytecode and extracting the fingerprint embedded in the contract creation bytecode to compare the extracted fingerprint with an original fingerprint. The original fingerprint refers to a fingerprint obtained by hashing original fingerprint information owned by an original author. A set of key information for verifying the smart contract watermark owned by the original author, or all of objects, in which the key information is recorded or stored, correspond to the original fingerprint. It should be noted that these technical ideas, meanings, or concepts are not affected by differences in terminology.

In the verifying step, watermarking bytes with the embedded watermark are extracted using the runtime bytecode based on the information acquired in the code analysis and watermark embedding step, and the watermark is restored and compared with an original watermark to verify the watermark.

Referring to FIG. 2, a watermarking method 100 for smart contract according to an embodiment of the present disclosure may perform a series of processes comprising a step 110 of compiling a source code of the smart contract to create a contract creation bytecode and a runtime bytecode, a step 120 of generating a control flow graph (CFG) including a plurality of byte regions based on the runtime bytecode, a step 130 of setting opcode groups by grouping consecutive opcodes in an opcode list in the plurality of byte regions of the generated control flow graph so that a sum of gas costs for the consecutive opcodes is greater than or equal to a preset gas cost value, a step 140 of extracting a watermarkable byte region capable of watermarking based on the set opcode groups, a step 150 of determining watermarking bytes, in which a watermark is to be embed in the watermarkable byte region, to embed the watermark and storing location information of the determined watermarking bytes, a step 160 of hashing fingerprint information including information on the watermark and the location information of the watermarking bytes to create a fingerprint, and a step 170 of embedding the created fingerprint in the contract creation bytecode to deploy the smart contract. The watermarking method 100 for smart contract may further comprise a step 180 of verifying watermarking for the deployed smart contract in which the fingerprint is embedded.

Referring to FIG. 3, the step 180 of verifying the watermarking according to an embodiment of the present disclosure may comprise a step 180-1 of acquiring the contract creation bytecode of the deployed smart contract in which the fingerprint is embedded, a step 180-2 of checking whether a value obtained by hashing the original fingerprint information matches the fingerprint embedded in the deployed smart contract, a step 180-3 of generating the control flow graph including the plurality of byte regions based on a verification runtime bytecode of the deployed smart contract in which the fingerprint is embedded (i.e., runtime bytecode for watermark verification, hereinafter referred to as 'verification runtime bytecode' for convenience of description) and determining a watermarkable byte region for the verification runtime bytecode based on the set opcode groups, a step 180-4 of extracting the watermarking bytes for the verification runtime bytecode, in which the watermark is pre-embedded, based on the determined watermarkable byte region for the verification runtime bytecode and the stored location information of the watermarking bytes, and a step 180-5 of restoring the watermark in the extracted watermarking bytes for the verification runtime bytecode and comparing the restored watermark with the original watermark of the original fingerprint information to verify the watermark.

Figure 4:
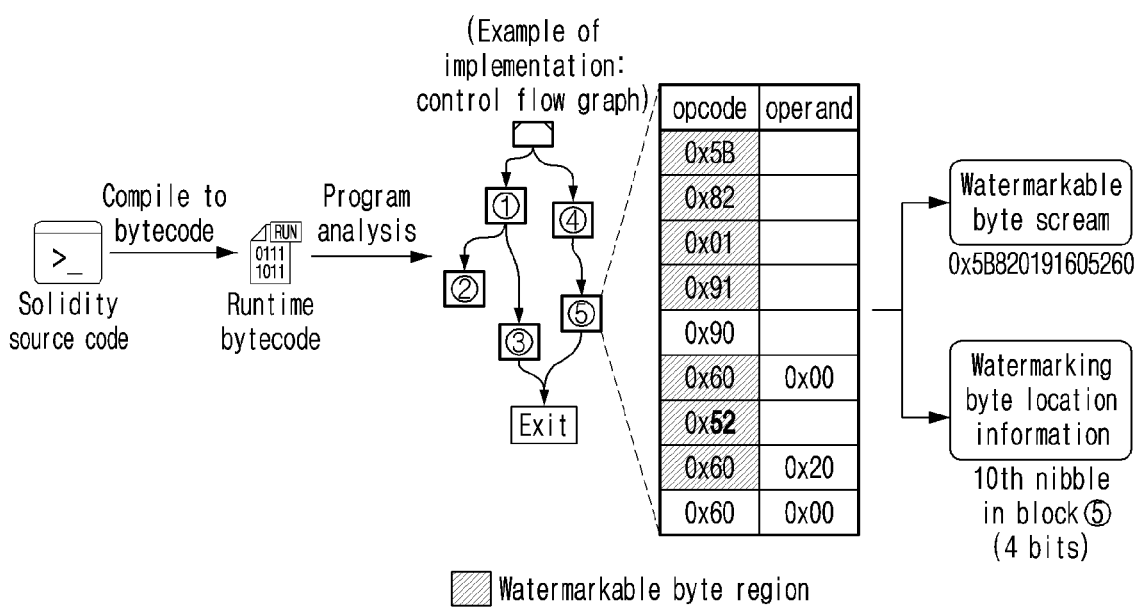
FIG. 4 conceptually illustrates a process of determining a watermarking byte to embed a watermark in a compiled runtime bytecode according to an embodiment of the present disclosure.

FIG. 4 conceptually illustrates a process of determining a watermarking byte to embed a watermark in a compiled runtime bytecode according to an embodiment of the present disclosure.

The step 110 compiles the source code of the smart contract to create the contract creation bytecode and the runtime bytecode.

The step 120 constructs the control flow graph (CFG) including the plurality of byte regions (see boxes 1 to 5 of FIG. 4) based on the runtime bytecode. The step 130 sets consecutive opcodes, in which a sum of gas costs for the consecutive opcodes of the opcode list in the extracted watermarkable byte region is greater than or equal to a preset gas cost value, as a group.

The step 140 extracts the watermarkable byte region based on the opcode groups thus formed. In the disclosed embodiment, by selecting some of the set opcode groups, the watermarkable byte region may be extracted in such a way that the selected opcode groups are consecutive.

The step 150 determines the 'watermarking bytes' (see opcode 0x52 of FIG. 4), in which the watermark is to be embed, to embed the watermark and stores its location information. The step 160 configures fingerprint information so that it includes a watermark to be used, information related thereto, location information of watermarking bytes, and the like, and creates a fingerprint by hashing the configured fingerprint information.

Figure 5:
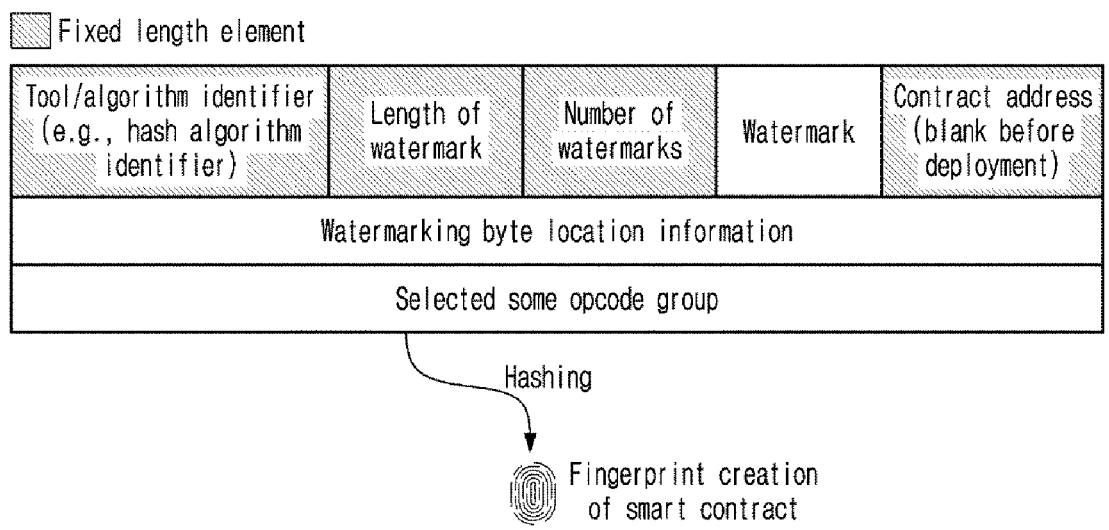
FIG. 5 illustrates a structure for a fingerprint creation according to an embodiment of the present disclosure.

FIG. 5 illustrates a structure for a fingerprint creation according to an embodiment of the present disclosure.

In the disclosed embodiment, the fingerprint information may include a watermark, a length of the watermark, the number of watermarks, location information of watermarking bytes, selected opcode groups, an algorithm identifier, and a contract address. A fingerprint may be generated by hashing the fingerprint information described above.

The step 170 embeds the created fingerprint in the contract creation bytecode to deploy the smart contract. In the disclosed embodiment, more specifically, the deployment process may initialize a variable value stored in a storage of the public blockchain network to the embedded fingerprint when the smart contract is created using the contract creation bytecode, embed the contract creation bytecode in transaction data to deploy the runtime bytecode on the public blockchain network, and store the created fingerprint in a storage of a contract account.

The step of embedding the watermark is completed through a series of processes as described above, and the step of verifying the watermark in the open smart contract is described below.

The step 180-1 acquires the deployed contract creation bytecode. The step 180-2 checks whether the value obtained by hashing the original fingerprint information owned by the original author of the smart contract, i.e., the original watermark and information related thereto, location information of watermarking bytes, and the like matches the fingerprint embedded in the contract creation bytecode of the deployed smart contract.

The step 180-3 generates the control flow graph including the plurality of byte regions based on the verification runtime bytecode (i.e., the runtime bytecode of the deployed smart contract) and determines the watermarkable byte region for the verification runtime bytecode based on the set opcode groups. In the embodiment disclosed herein, the determination based on the set opcode groups may be performed by using some opcode groups selected from among the set opcode groups, and the selected opcode groups may be included in the original fingerprint information (see FIG. 5).

Further, the verification runtime bytecode may be deployed by the original author after the step of embedding the watermark in the bytecode of the smart contract in accordance with the disclosed embodiment, or may be deployed by a third party not the original author.

The step 180-4 extracts the watermarking bytes for the verification runtime bytecode, in which the watermark is pre-embedded, based on the watermarkable byte region determined for the verification runtime bytecode and the location information of the stored watermarking bytes included in the original fingerprint information.

The step 180-5 restores the watermark in the watermarking bytes for the verification runtime bytecode and compares the restored watermark with the original watermark included in the original fingerprint information to verify the watermark. In the disclosed embodiment, when a plurality of watermarks are embedded in the verification runtime bytecode, if one of the restored watermarks matches the original watermark included in the original fingerprint information as a result of comparison, in other words, if the watermarks are restored so that even one watermark can be determined to match the original watermark, the watermarks may be considered to be verified. Hence, it can be determined that the deployed smart contract is the smart contract of the original author.

Figure 6:
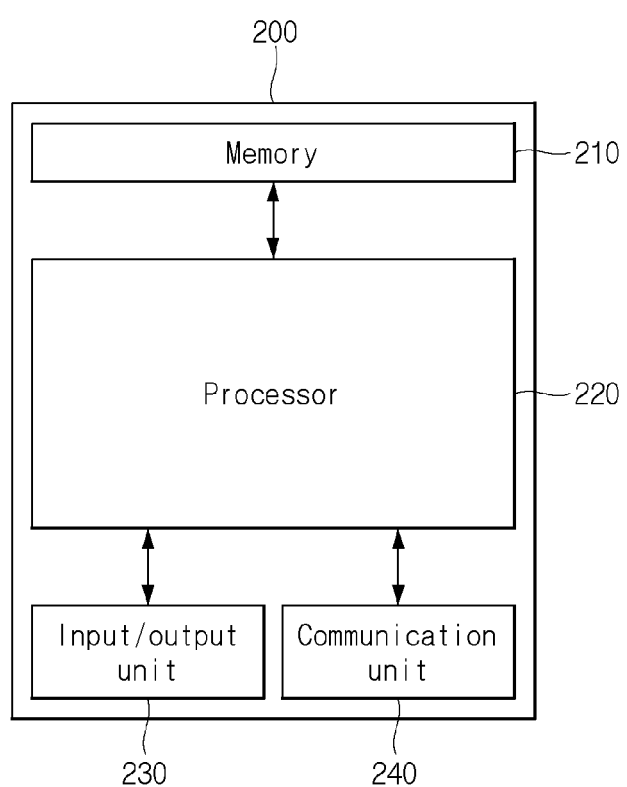
FIG. 6 conceptually illustrates a smart contract watermarking device according to an embodiment of the present disclosure.

FIG. 6 conceptually illustrates a smart contract watermarking device according to an embodiment of the present disclosure.

A smart contract watermarking device 200 may include a memory 210, a processor 220, an input/output unit 230, and a communication unit 240. The memory 210 is a storage medium readable by the smart contract watermarking device 200 for storing information used or output by the smart contract watermarking device 200. The memory 210 may include a permanent mass storage device, such as a random access memory (RAM), a read only memory (ROM), and a disc drive. The memory 210 may also store program codes for the smart contract watermarking method 100.

The processor 220 may be configured to process instructions of a computer program by performing basic arithmetic, logic, and input/output operations related to the smart contract watermarking method 100. The instructions may be provided to the processor 220 by the memory 210 or the communication unit 240. For example, the processor 220 may be configured to execute the received instructions based on program codes stored in a storage device such as the memory 210. The processor 220 may also be configured to execute program codes for setting opcode groups based on a gas cost and determining watermarking bytes. The program codes may be stored in a storage device such as the memory 210.

The input/output unit 230 may be a device for receiving information from a user and a display for outputting information. For example, an input device may include a device such as a microphone, a keyboard, or a mouse, and an output device may include a device such as a display and a speaker. The communication unit 240 may provide a function that allows the smart contract watermarking device 200 to communicate with a user receiving a smart contract watermarking service via a network.

In other embodiments, the smart contract watermarking device 200 may include fewer or more components than the components of FIG. 6. However, a clear illustration of most of the related art components is omitted. For example, the smart contract watermarking device 200 may include at least some of the above-described input and output devices, or may further include other components such as an interface such as a network interface, a transceiver, and a database.

As described above, the watermarking method for smart contract according to an embodiment of the present disclosure achieves advantages of using a watermark without an additional executable code and a gas fee in the smart contract by determining a watermarking byte to embed a watermark in a way of grouping consecutive opcodes of a runtime bytecode based on a gas cost, creating a fingerprint based on this, and verifying the watermark embedded in the deployed smart contract using the fingerprint.

Embodiments of the present disclosure can be implemented as computer-readable codes on a computer-readable recording medium. The computer-readable recording medium includes all types of recording devices in which data readable by a computer system is stored.

Examples of the computer-readable recording medium include a ROM, a RAM, a CD-ROM, a magnetic tape, a floppy disk, an optical data storage device, etc., and also include implementation in the form of a carrier wave (e.g., transmission over the Internet). Further, the computer-readable recording medium may be distributed to computer systems connected over a network, and computer-readable codes may be stored and executed in a distributed manner Functional programs, codes, and code segments for implementing the present disclosure can be easily construed by programmers skilled in the art to which the present disclosure pertains.

Since various modified examples can be made by a configuration and a method described and exemplified in the present disclosure without departing from the scope of the present disclosure, all matters included in the detailed description or illustrated in the accompanying drawings are illustrative and do not limit the present disclosure. Accordingly, the scope of the present disclosure is not limited by the exemplary embodiment, but should be defined only according to the following claims and equivalents thereto.

What is claimed is:

1. A watermarking method for smart contract, comprising:
    compiling a source code of a smart contract to create a contract creation bytecode and a runtime bytecode;
    generating a control flow graph including a plurality of byte regions based on the runtime bytecode;
    setting opcode groups by grouping consecutive opcodes in an opcode list in the plurality of byte regions of the generated control flow graph so that a sum of gas costs for the consecutive opcodes is greater than or equal to a preset gas cost value;
    extracting a watermarkable byte region based on the set opcode groups;
    determining watermarking bytes, in which a watermark is to be embed in the watermarkable byte region, to embed the watermark and storing location information of the determined watermarking bytes;
    hashing fingerprint information including information on the watermark and the location information of the watermarking bytes to create a fingerprint; and
    embedding the created fingerprint in the contract creation bytecode to deploy the smart contract.

2. The watermarking method of claim 1, further comprising:
    verifying a watermarking for the deployed smart contract in which the fingerprint is embedded,
    wherein verifying the watermarking comprises:
    acquiring the contract creation bytecode of the deployed smart contract in which the fingerprint is embedded;
    checking whether a value obtained by hashing original fingerprint information matches the embedded fingerprint in the deployed smart contract;
    generating the control flow graph including the plurality of byte regions based on a verification runtime bytecode of the deployed smart contract in which the fingerprint is embedded, and determining a watermarkable byte region for the verification runtime bytecode based on the set opcode groups;
    extracting the watermarking bytes for the verification runtime bytecode, in which the watermark is pre-embedded, based on the determined watermarkable byte region for the verification runtime bytecode and the stored location information of the watermarking bytes; and
    restoring the watermark in the extracted watermarking bytes for the verification runtime bytecode and comparing the restored watermark with an original watermark of the original fingerprint information to verify the watermark.

3. The watermarking method of claim 1, wherein extracting the watermarkable byte region based on the set opcode groups comprises selecting some of the set opcode groups and extracting the watermarkable byte region so that the selected opcode groups are consecutive.

4. The watermarking method of claim 3, wherein the fingerprint information includes the watermark, a length of the watermark, a number of the watermarks, the location information of the watermarking bytes, the selected opcode groups, an algorithm identifier, and a contract address.

5. The watermarking method of claim 1, wherein embedding the created fingerprint in the contract creation bytecode to deploy the smart contract comprises:
    initializing a variable value stored in a storage of a public blockchain network to the embedded fingerprint when the smart contract is created using the contract creation bytecode; and
    embedding the contract creation bytecode in transaction data to deploy the runtime bytecode on the public blockchain network, and storing the created fingerprint in a storage of a contract account.

6. The watermarking method of claim 2, wherein verifying the watermark comprises:
    when the plurality of watermarks is embedded in the verification runtime bytecode, at least one of the plurality of watermarks is restored, and the watermark is considered to be verified when the at least one restored watermark is compared with and matches the original watermark of the original fingerprint information.

7. A smart contract watermarking device comprising:
a communication unit configured to transmit and receive data with a user;
a memory configured to store a source code of a smart contract;
at least one processor connected to the memory; and
an input/output unit,
wherein the at least one processor is configured to:
compile the source code of the smart contract and create a contract creation bytecode and a runtime bytecode;
generate a control flow graph including a plurality of byte regions based on the runtime bytecode;
set opcode groups by grouping consecutive opcodes in an opcode list in the plurality of byte regions of the generated control flow graph so that a sum of gas costs for the consecutive opcodes is greater than or equal to a preset gas cost value;
extract a watermarkable byte region based on the set opcode groups;
determine watermarking bytes, in which a watermark is to be embed in the watermarkable byte region, to embed the watermark and store location information of the determined watermarking bytes;
hash fingerprint information including information on the watermark and the location information of the watermarking bytes to create a fingerprint; and
embed the created fingerprint in the contract creation bytecode and deploy the smart contract.

8. The smart contract watermarking device of claim 7, wherein the at least one processor is further configured to verify a watermarking for the deployed smart contract in which the fingerprint is embedded, and
wherein verifying the watermarking comprises:
acquiring the contract creation bytecode of the deployed smart contract in which the fingerprint is embedded;
checking whether a value obtained by hashing original fingerprint information matches the embedded fingerprint in the deployed smart contract;
generating the control flow graph including the plurality of byte regions based on a verification runtime bytecode of the deployed smart contract in which the fingerprint is embedded, and determining a watermarkable byte region for the verification runtime bytecode based on the set opcode groups;
extracting the watermarking bytes for the verification runtime bytecode, in which the watermark is pre-embedded, based on the determined watermarkable byte region for the verification runtime bytecode and the stored location information of the watermarking bytes; and
restoring the watermark in the extracted watermarking bytes for the verification runtime bytecode and comparing the restored watermark with an original watermark of the original fingerprint information to verify the watermark.

9. The smart contract watermarking device of claim 7, wherein extracting the watermarkable byte region based on the set opcode groups comprises selecting some of the set opcode groups and extracting the watermarkable byte region so that the selected opcode groups are consecutive.

10. The smart contract watermarking device of claim 9, wherein the fingerprint information includes the watermark, a length of the watermark, a number of the watermarks, the location information of the watermarking bytes, the selected opcode groups, an algorithm identifier, and a contract address.

11. The smart contract watermarking device of claim 7, wherein an operation of embedding the created fingerprint in the contract creation bytecode and deploying the smart contract performed by the at least one processor comprises:
initializing a variable value stored in a storage of a public blockchain network to the embedded fingerprint when the smart contract is created using the contract creation bytecode; and
embedding the contract creation bytecode in transaction data to deploy the runtime bytecode on the public blockchain network, and storing the created fingerprint in a storage of a contract account.

12. The smart contract watermarking device of claim 8, wherein verifying the watermark comprises:
when the plurality of watermarks is embedded in the verification runtime bytecode, at least one of the plurality of watermarks is restored, and the watermark is considered to be verified when the at least one restored watermark is compared with and matches the original watermark of the original fingerprint information.

13. A computer readable recording medium in which a program of instructions capable of being executed by a digital processing device for smart contract watermarking is tangibly implemented, the computer readable recording medium being a recording medium readable by the digital processing device,
wherein a program for executing the method according to claim 1 on a computer is recorded on the computer readable recording medium.

* * * * *